United States Patent
McCain

(10) Patent No.: US 10,159,235 B2
(45) Date of Patent: Dec. 25, 2018

(54) ENCLOSURE FOR A FISHING REEL IN THE FORM OF A TOY VEHICLE

(71) Applicant: Todd McCain, Midlothian, IL (US)

(72) Inventor: Todd McCain, Midlothian, IL (US)

( * ) Notice: Subject to any disclaimer, the term of this patent is extended or adjusted under 35 U.S.C. 154(b) by 356 days.

(21) Appl. No.: 15/140,420

(22) Filed: Apr. 27, 2016

(65) Prior Publication Data

US 2017/0311582 A1    Nov. 2, 2017

(51) Int. Cl.
| | | |
|---|---|---|
| *A01K 89/01* | (2006.01) | |
| *A01K 89/015* | (2006.01) | |
| *A01K 89/00* | (2006.01) | |
| *A63H 17/00* | (2006.01) | |
| *A63H 17/44* | (2006.01) | |

(52) U.S. Cl.
CPC ........ *A01K 89/01921* (2015.05); *A01K 89/00* (2013.01); *A01K 89/006* (2013.01); *A01K 89/015* (2013.01); *A01K 89/01925* (2015.05); *A01K 89/01931* (2015.05); *A63H 17/00* (2013.01); *A63H 17/44* (2013.01)

(58) Field of Classification Search
CPC ........ A01K 89/01012; A01K 89/01025; A01K 89/01026; A01K 89/01029; A01K 89/01921; A01K 89/01123; A63H 17/262
See application file for complete search history.

(56) References Cited

U.S. PATENT DOCUMENTS

| | | | |
|---|---|---|---|
| 2,532,119 A * | 11/1950 | Reynolds | B65D 85/00 206/315.11 |
| 3,762,592 A | 10/1973 | Mayes | |
| D26,758 S | 1/1983 | Price | |
| D340,576 S | 10/1993 | Delagarza | |
| 5,307,910 A * | 5/1994 | Im | B62K 5/02 192/13 R |
| 5,426,883 A * | 6/1995 | Roberts | A01K 93/00 43/42.31 |
| 5,501,029 A * | 3/1996 | McDaniel, Sr. | A01K 97/00 43/26 |
| 5,881,489 A | 3/1999 | Young | |
| 5,937,568 A * | 8/1999 | Morgan | A01K 97/08 43/21.2 |
| 5,956,885 A * | 9/1999 | Zirbes | A01K 97/00 43/26 |
| 6,022,025 A * | 2/2000 | Chuang | A63H 13/02 273/443 |
| 6,263,610 B1 * | 7/2001 | Doubts, Jr. | A01K 97/00 43/26 |
| 6,564,498 B2 * | 5/2003 | Sawtell | A01K 97/08 43/26 |
| 6,595,824 B2 | 7/2003 | Calello | |
| 6,668,481 B2 * | 12/2003 | Garcia | A01K 97/08 43/26 |
| 6,910,895 B1 * | 6/2005 | Gevedon | G09B 19/00 434/247 |
| 239,456 A1 | 9/2013 | Leffler | |

* cited by examiner

*Primary Examiner* — Emmanuel M Marcelo
(74) *Attorney, Agent, or Firm* — UCLA Patent Law Clinic

(57) ABSTRACT

A fishing reel which includes a covering or enclosure that can also be functionally used as a toy car when detached from the fishing rod. The fishing reel functions as traditional spincast fishing reel when attached to the fishing rod. The reel enclosure is formed in the shape of a toy vehicle and is detachable from the fishing rod. Once removed, the reel enclosure can be reassembled and used as a toy vehicle independent of the rod.

16 Claims, 5 Drawing Sheets

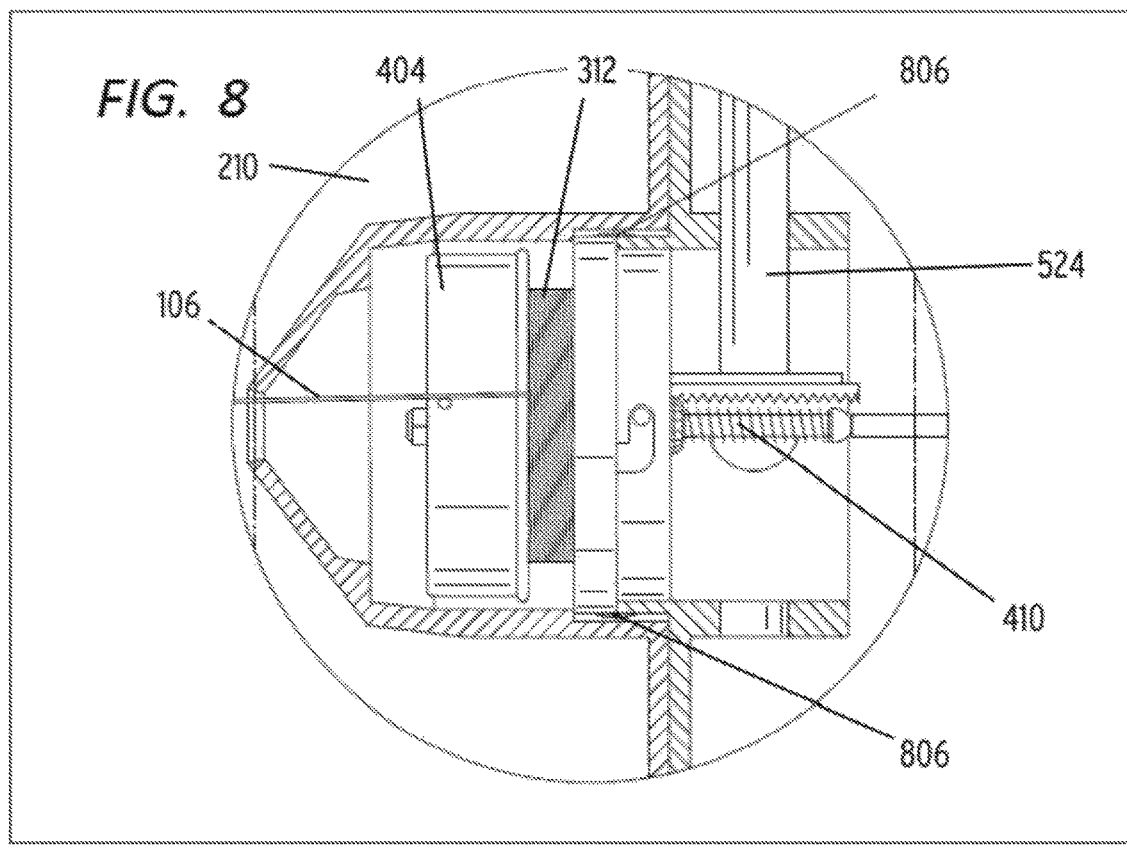

ENCLOSURE FOR A FISHING REEL IN THE FORM OF A TOY VEHICLE

BACKGROUND

Field of the Technology

The invention relates to the field of enclosures for fishing reels (CPC A01K 89/00) and in particular reel enclosures taking the form of a toy vehicle such as a car or truck. The present invention also relates to a toy and more particularly, a toy vehicle. In particular, the present invention relates to an improved fishing reel enclosure that can also be utilized as a toy car.

Description of the Prior Art

Today, many children are limited by choice or by circumstance to indoor activities. Having meaningful outdoor activity and interactions with nature are important facets of childhood. Learning to fish at a young age can provide opportunities for bonding experiences as young children fish with friends and relatives. Visually stimulating fishing reel enclosures that can also be used as toys, independent of the rod will encourage young children to fish outdoors.

Fishing reels have long had enclosures protecting the reel from the environment and providing an aesthetic appearance. These enclosures have taken on a variety of shapes and designs. These designs have been used to improve the visual appeal of the fishing equipment. Typically, the entire reel and gripping end of the fishing rod has been incorporated within a decorative cover, such as soda bottle shape or rifle shape, so that the fishing rod and reel takes on the appearance of the decorative cover, at least as to the gripping portion. The decorative cover is fixed to the fishing rod and reel and has no separate utility other than as a cover and grip for the fishing rod and reel.

Prior art reel enclosures are not capable of being removed from the rod and used for any other purpose. None of the prior art decorative accessories used on fishing rods have utility as a result of their décor outside of their use as fishing rod. In particular, none of the prior art reel enclosures provide a detachable toy car that houses the reel when attached to the rod, but which can also be removed from the rod and used as a fully functional toy.

BRIEF SUMMARY

In accordance with the invention, reel enclosures are enhanced by forming the reel enclosure in the shape of a toy vehicle, including in the embodiment where the toy vehicle is a car or truck, adding a plurality of rotatable wheels, and forming the enclosure so that it can be removed from the rod, reassembled, and used as a toy apart from the fishing rod. The apparatus includes an enclosure around the reel, leaving the spool and reel mechanism on the rod while the enclosure is removed or includes an enclosure coupled to the reel, so that the entire reel assembly is removed from the rod with the enclosure used as a toy without the need to separate the reel from the enclosure. In such a latter embodiment the toy enclosure may also enclose a separate reel cover that is integrated or provided with the reel. Both embodiments, with or without the reel and/or a reel cover included within the enclosure, are referred to herein simply as an "enclosure."

The illustrated embodiment is shown as a spin casting fishing reel including a thump stop, that when pushed, releases the fishing line, allowing the user to cast out the line. The particular mechanics of the reel itself depend on the cost and level of sophistication of the design of the reel. However, all levels and cost ranges are included within the range of the illustrated embodiments. The reel enclosure does not in any substantial manner interfere with the conventional functioning of the spin casting reel disposed within it, when it is attached to the rod. Similarly, when the reel is removed from the rod, the inclusion of the reel within the enclosure or the fact that the reel was included within the enclosure when attached to the rod, in no way substantially interferes with the functioning of the enclosure as a toy vehicle.

The illustrated embodiment shows two separate portions that connect together to complete the enclosure. These portions are also connected to each other while the enclosure is being used as a toy. The two portions are disconnected for the purpose of re-spooling and manipulating the reel. While fishing, the reel is connected to a fishing rod through a conventional fitting or stirrup. A hole is defined in the front of the car that allows the fishing line to travel from the inside of the reel to the outside.

The toy vehicle can be made from any desired material. Particular embodiments of the invention may, however, advantageously use plastic or metal.

While using the enclosure as a toy car or truck, it is capable of being used independently of the reel and rod, and has the capacity to roll across a surface using rotating wheels.

The illustrated embodiments of the invention can now be summarized to include an apparatus for a fishing rod including a reel attachable to the fishing rod, a reel foot coupled to the reel to connect the reel to the fishing rod, and a toy vehicle used as a detachable cover assembled around the reel, the toy vehicle being removable from the fishing rod, and functional as a plaything when removed from the fishing rod.

The toy vehicle in one embodiment includes two separable portions to allow selective access to the reel.

The reel includes an open spool onto which a fishing line is capable of being wound or unwound, the detachable cover comprises a two-part shell formed in the shape of a toy vehicle which envelops the open spool and, when one part of the two-part shell is detached from the other part of the two-part shell, allows access to the open spool. By an open spool it is understood that the spool may be directly accessible and does not have an additional cover enclosing it other than the toy vehicle.

The toy vehicle, when embodied as a car or truck, includes a plurality of rotatable wheels.

In one embodiment the reel is a spin casting reel with a line release the toy vehicle includes a rotatable rear trunk lid, and the rotatable rear trunk lid, when depressed and when the toy vehicle is assembled onto the spin casting reel, is coupled to and actuates the line release of the spin casting reel.

The apparatus may further include a detachable reel crank selectively coupled to the reel and accessible outside the toy vehicle when the toy vehicle is assembled onto the reel.

The embodiments of the invention may also include an apparatus for a fishing rod including a reel attachable to the fishing rod and a detachable shell formed in the shape of a toy vehicle which covers the reel, the toy vehicle being removable from the fishing rod and functional as a plaything when removed from the fishing rod.

The detachable shell is comprised of two portions which are assemblable to form the toy vehicle and which are at least partially disassemblable to allow access to the reel while the reel is mounted on the fishing rod.

The reel comprises an open spool onto which a fishing line is capable of being wound or unwound, the detachable shell comprises a two-part shell formed in the shape of a toy vehicle which envelops the open spool and, when one part of the two-part shell is detached from the other part of the two-part shell, allows access to the open spool. As above, by an open spool it is understood that the spool may be directly accessible and does not have an additional cover enclosing it other than the toy vehicle.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The disclosure can be better visualized by turning now to the following drawings wherein like elements are referenced by like numerals.

BRIEF DESCRIPTION OF THE DRAWINGS

FIG. 8 is a top plan elevational view of the reel within the enclosure of FIGS. 1-6 with a welded portion that couples the reel to the enclosure to create a possible embodiment where the encasing and the reel apparatus are a single integrated unit.

The disclosure and its various embodiments can now be better understood by turning to the following detailed description of the preferred embodiments which are presented as illustrated examples of the embodiments defined in the claims. It is expressly understood that the embodiments as defined by the claims may be broader than the illustrated embodiments described below.

DETAILED DESCRIPTION OF THE PREFERRED EMBODIMENTS

Figure 1:
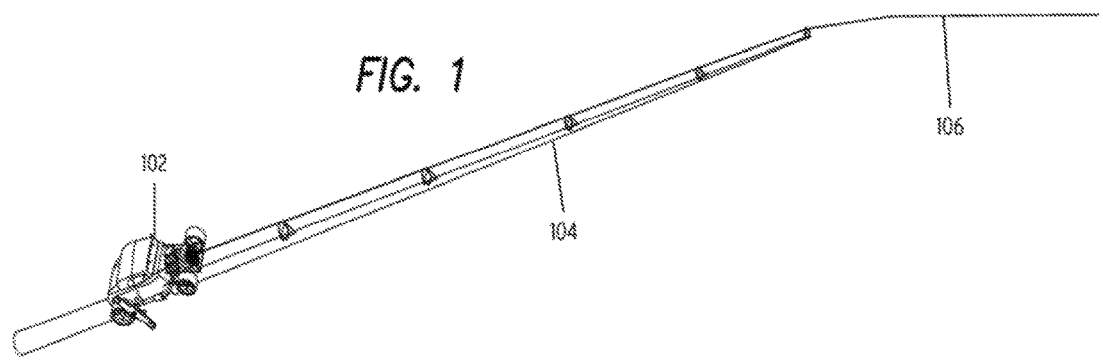
FIG. 1 is a perspective view of a fishing rod with a reel enclosure in the form of a toy car attached to the rod according to the illustrated embodiments of the invention.

FIG. 1 illustrates an embodiment of the invention wherein a fishing rod 106 is combined with a reel enclosure 102 in the form of a toy vehicle (hereinafter referred to interchangeably as enclosure or toy vehicle 102). It is within the scope of the invention that the toy vehicle 102 could take the form of a car, truck, bus, motorcycle, bicycle, plane, boat, ship, submarine, rocket or any other kind of toy vehicle.

Figure 2:
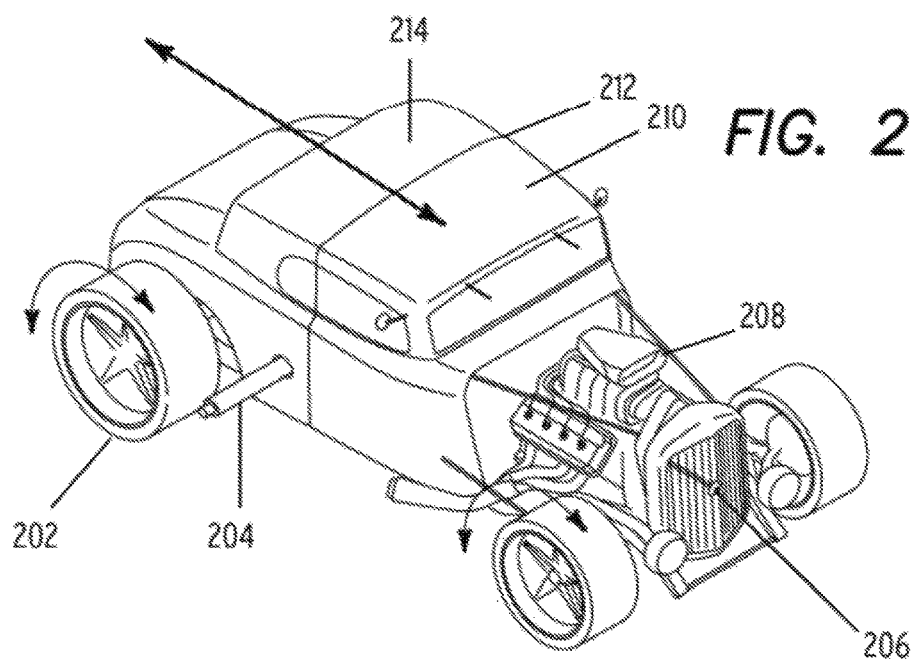
FIG. 2 is a perspective view of the toy car of FIG. 1 shown in isolation of the fishing rod or detached therefrom to function as a free-standing toy with the fishing crank removed.

FIG. 2 is a perspective view of toy vehicle 102 in the form of a customized hot rod or car having racing slicks or tires 202 and an exposed turbocharged engine 208. Tires 202 are rotatable so that toy vehicle 102 is capable of rolling over a surface when detached from rod 104 as a fully functionalized toy vehicle or plaything.

Line 212 is the line of separation of portions 210 and 214 of toy vehicle 102 which portions 210 and 214 snap fit together or can be manually pulled apart by the user using conventional resilient reconnection fittings (not shown). The front of vehicle 102 is provided with a defined hole and line guide 206 through which fishing line 106 shown in FIG. 1 is threaded and can run to allow use of vehicle 102 as a cover or enclosure for fishing reel or casting reel 304 when installed onto rod 106.

The spin casting reel 304 is well known and is conventional, except to the extent modified as described below in order to be included and operable within a toy vehicle 102 and will be described only to the extent to make the relationship of its parts to the reel enclosure or toy vehicle 102 clear. While the illustrated embodiment shows a spin casting reel 304, it is within the spirit and scope of the illustrated embodiments of the invention that any other type of fishing reel may be substituted and used with appropriate modifications consistent with the present teachings as may be needed to be included in the illustrated embodiment. As better seen in the cut-away side elevational view of FIG. 3 the trunk of vehicle 102 is rotatable about pivot 310 and serves as a thumb stop 308 of reel 304. While fishing, this stop 308 is pushed in order by the user to cast out fishing line 106. In one embodiment reel 304 includes a center shaft 410. When the thumb stop 308 is pushed, the center shaft 410 moves forward to disengage a line pickup of a pickup pin 314 as best illustrated in the side cut-away view of FIG. 3. The thumb stop 308 is then released during a forward cast to allow the fishing line to fly off of spool 312. Spool 312 is coupled to crank handle 506 in order to allow line 106 to be taken up and respooled onto spool 312 by means of a conventional spinner head assembly 404. Head assembly 404 rotates as the user cranks the crank handle 506 in order to spool the line back into reel 304 and collect it on the spool 312 using pickup pin 314. When the center shaft 410 is pushed in, the pickup pin 314 moves inside the spinner head assembly 404 to allow the fishing line 106 to fly off of the spool 312. Once the crank handle 506 is rotated or cranked in order to spool the fishing line 106, the pickup pin 314 moves into the spinner head assembly 404 in a conventional manner in order to allow fishing line 106 to be collected onto the spool 312.

Figure 3:
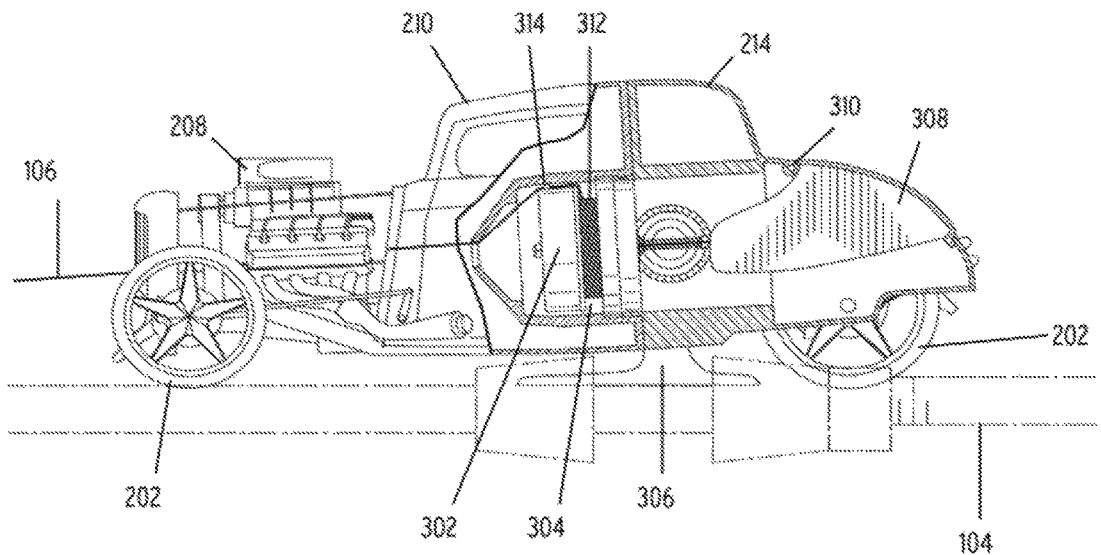
FIG. 3 is a side elevational view of the reel enclosure or toy car of FIGS. 1 and 2 shown in partially cut-away view to reveal the reel within the enclosure of the toy car when attached to the fishing rod.
Figure 4:
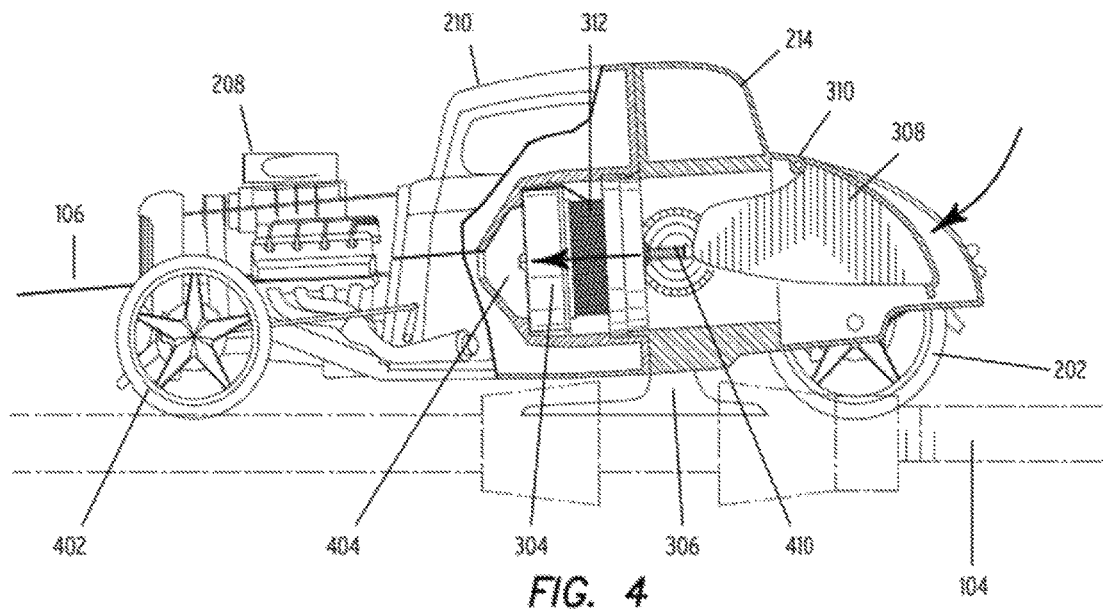
FIG. 4 is the view of FIG. 3 showing the thumb stop being pushed inward for the purpose of allowing the reel to cast a fishing line outward.
Figure 5:
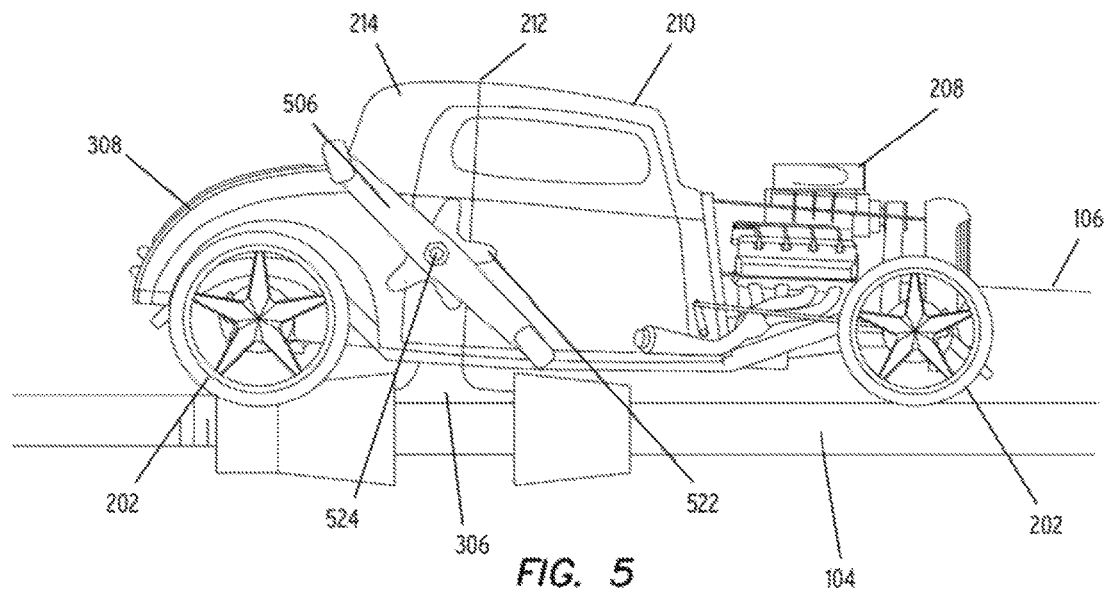
FIG. 5 is a side elevational view of the enclosure or toy car of FIGS. 1-4 shown as attached to the rod and with the reel crank installed.
Figure 6:
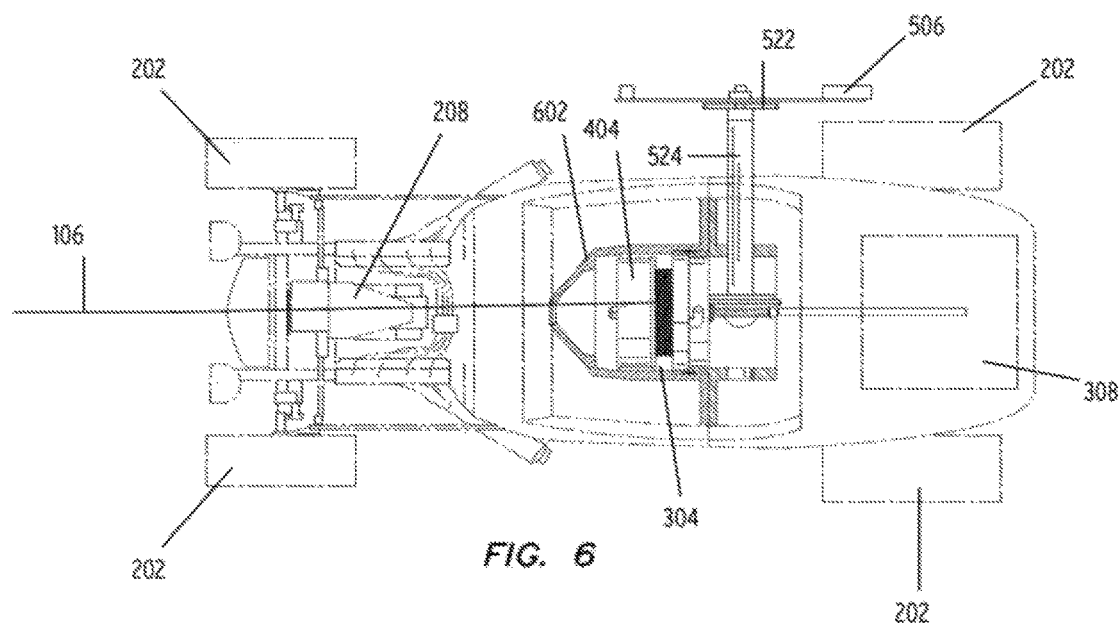
FIG. 6 is a top plan elevational view of the reel enclosure or toy car of FIGS. 1-5 with the top of the toy car removed to show the placement and working of the reel within the reel enclosure or toy car.

Reel 304 is mounted on a reel foot 306 attached to fishing rod 104 as illustrated in FIGS. 3-5. Reel foot 306 is attachable to rod 104 using conventional means and remains attached to vehicle 102 when vehicle 102 is removed from rod 104 and used as a free standing toy. The extent of reel foot 306 from the base of vehicle 102 is configured to allow wheels 202 of vehicle 102 to contact a level surface and rotate without interference when vehicle 102 is removed from rod 104. Crank handle 506 may be removed from crank shaft 524 when vehicle 102 is detached from rod 104 as shown in FIG. 2, or may be allowed to remain installed on crank shaft 524 as shown in FIG. 5. This part is rotated in order to spin the spinner head assembly 404, thus spooling the fishing line 106 onto reel 304. As best seen in FIG. 6 crank handle 506 is mounted to crank shaft 524 using an adjustable crank nut 522. The crank shaft 524 is inserted into the reel 304 and then screwed in by the thumb wheel crank nut 522 onto crank shaft 524 as best seen in the side elevational view of FIG. 5 to provide an adjustable drag to reel 304.

Figure 7:
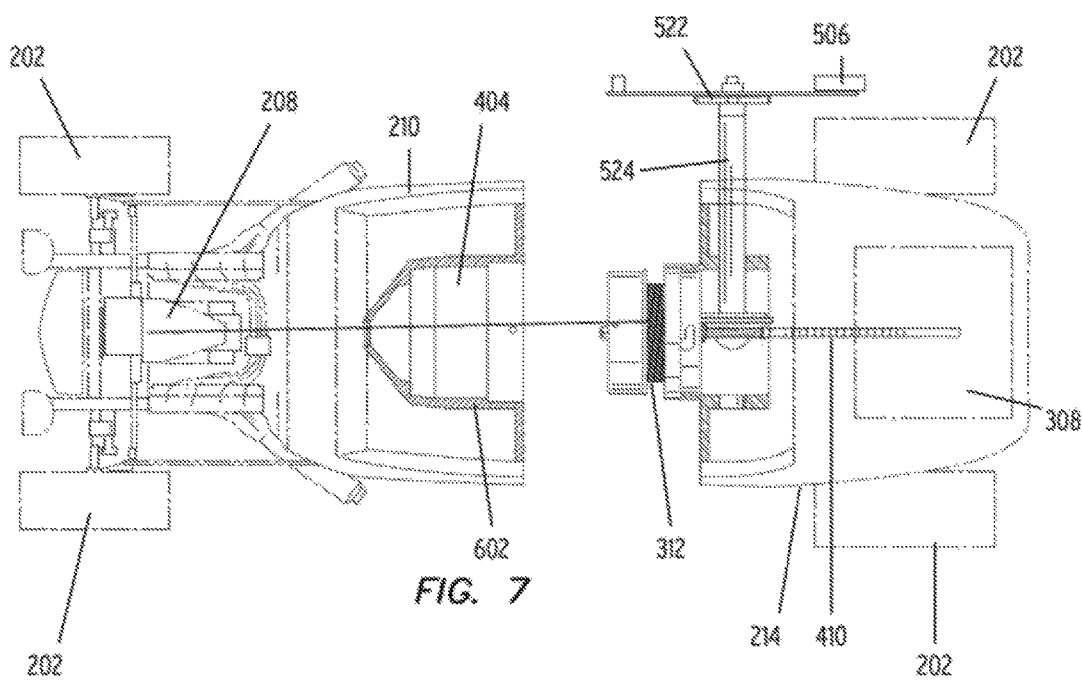
FIG. 7 is a top plan elevational view of the reel enclosure or toy car of FIG. 6 with the two separate portions of the reel enclosure or toy car pulled apart and with the top of the reel enclosure or toy car removed to show how access to the reel is allowed when the reel enclosure or toy car is attached to the rod. When the reel enclosure or toy car is used for fishing or as a toy car, the two portions are attached to each other.

FIG. 7 is a top plan view of vehicle 102 shown in a separated configuration with portions 210 and 214 pulled apart to provide free access to spool 312. A front shell 602 of reel 304 is fixed to portion 210 and is carried forward with portion 210 when separated from portion 214 to which the remainder of the elements of reel 304 are attached. Reel foot 306 in the preferred embodiment is coupled to a lower portion 214 of vehicle 102, but may be alternatively coupled to portion 210.

FIG. 8 is an enlarged illustration of the reel 304. In the preferred embodiment, the reel 304 is coupled through a weld 806 to portion 210, but may be alternatively coupled to portion 214. It is possible that the reel 304 is coupled to both 210 and 214, or alternatively that the reel 304 is not coupled to either portion.

It is entirely within the scope of the illustrated embodiments that vehicle 102 could be made in the form of a one piece shell and be removable from reel 304 by lifting vehicle 102 away from reel 304 to which it is temporarily coupled by a snap fitting or resilient clamp engaging reel 304. In this embodiment, reel 304 would then remain connected to rod 104 when vehicle 102 is removed to be used as a free standing toy.

It is entirely within the scope of the illustrated embodiments that vehicle 102 could be formed in two roughly equal sized portions 214, 210 that snap fit along a latitudinal midpoint 212. It is also within the scope of the illustrated embodiments that vehicle 102 is formed from more than two portions. It is also possible that the vehicle 102 is formed by a plurality of portions which are coupled to or on top of each other.

Many alterations and modifications may be made by those having ordinary skill in the art without departing from the spirit and scope of the embodiments. Therefore, it must be understood that the illustrated embodiment has been set forth only for the purposes of example and that it should not be taken as limiting the embodiments as defined by the following embodiments and its various embodiments.

Therefore, it must be understood that the illustrated embodiment has been set forth only for the purposes of example and that it should not be taken as limiting the embodiments as defined by the following claims. For example, notwithstanding the fact that the elements of a claim are set forth below in a certain combination, it must be expressly understood that the embodiments includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the embodiments is explicitly contemplated as within the scope of the embodiments.

The words used in this specification to describe the various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the embodiments.

I claim:

1. An apparatus for a fishing rod comprising:
a reel attachable to the fishing rod; and
a toy vehicle used as a cover assembled around the reel, the toy vehicle being removable from the reel, and functional as a plaything when removed from the reel, wherein the toy vehicle includes rotatable wheels.

2. The apparatus of claim 1, wherein the toy vehicle is comprised of two separate portions to allow selective access to the reel.

3. An apparatus for a fishing rod comprising:
a reel attached to the fishing rod;
a reel foot coupled to the reel to connect the reel to the fishing rod; and
a toy vehicle used as a cover assembled around the reel, the toy vehicle being removable from the fishing rod, and functional as a plaything when removed from the fishing rod, wherein the toy vehicle includes rotatable wheels.

4. The apparatus of claim 3, where the reel comprises a spin casting reel with a line release and where the toy vehicle includes a rotatable rear trunk lid, wherein the rotatable rear trunk lid, when depressed and when the toy vehicle is assembled onto the spin casting reel, is coupled to and actuates the line release of the spin casting reel.

5. The apparatus of claim 3, wherein the toy vehicle is comprised of two separable portions to allow selective access to the reel.

6. The apparatus of claim 3, wherein the reel comprises an open spool onto which a fishing line is capable of being wound or unwound, the toy vehicle comprises a two-part shell which envelops the open spool and, when one part of the two-part shell is detached from the other part of the two-part shell, allows access to the open spool.

7. The apparatus of claim 3, wherein the toy vehicle is affixed, either temporarily or permanently, to the reel.

8. The apparatus of claim 3, further comprising a detachable reel crank selectively coupled to the reel and accessible outside the toy vehicle when the toy vehicle is assembled onto the reel.

9. An apparatus for a fishing reel comprising:
 a toy vehicle used as a cover assembled around the reel, the toy vehicle being removable from the reel and functional as a plaything when removed from the reel, wherein:
  the toy vehicle is temporarily coupled to the reel by a snap fitting or resilient clamp; and
  the toy vehicle includes rotatable wheels.

10. A toy vehicle comprising:
 rotatable wheels;
 separable portions, allowing the toy vehicle to disassemble and reassemble;
 a fishing reel coupled, either temporarily or permanently to one or all of the separable portions; and
 a reel foot coupled to the fishing reel to allow the fishing reel to be coupled to a fishing rod.

11. The apparatus of claim 10, wherein the reel comprises a spin casting reel with a line release and where the toy vehicle includes a rotatable rear trunk lid, wherein the rotatable rear trunk lid, when depressed and when the toy vehicle is assembled onto the spin casting reel, is coupled to and actuates the line release of the spin casting reel.

12. The apparatus of claim 10, wherein the reel comprises an open spool onto which a fishing line is capable of being wound or unwound, the toy vehicle comprises a two-part shell which envelops the open spool and, when one part of the two-part shell is detached from the other part of the two-part shell, allows access to the open spool.

13. A toy vehicle comprising:
 rotatable wheels;
 separable portions, allowing the toy vehicle to disassemble and reassemble; and
 a fishing rod coupled, either temporarily or permanently to one or all of the separable portions.

14. The apparatus of claim 13, wherein the reel comprises a spin casting reel with a line release and where the toy vehicle includes a rotatable rear trunk lid, wherein the rotatable rear trunk lid, when depressed and when the toy vehicle is assembled onto the spin casting reel, is coupled to and actuates the line release of the spin casting reel.

15. The apparatus of claim 13, wherein the reel comprises an open spool onto which a fishing line is capable of being wound or unwound, the toy vehicle comprises a two-part shell which envelops the open spool and, when one part of the two-part shell is detached from the other part of the two-part shell, allows access to the open spool.

16. A spin-casting reel comprising:
 an outer shell that is temporarily or permanently affixed to the reel that is formed in the shape of a toy vehicle, including rotatable wheels; and
 the reel being functional as a plaything.

\* \* \* \* \*